W. A. Durrin,
Cattle Pump,
Nº 37,744. Patented Feb. 24, 1863.
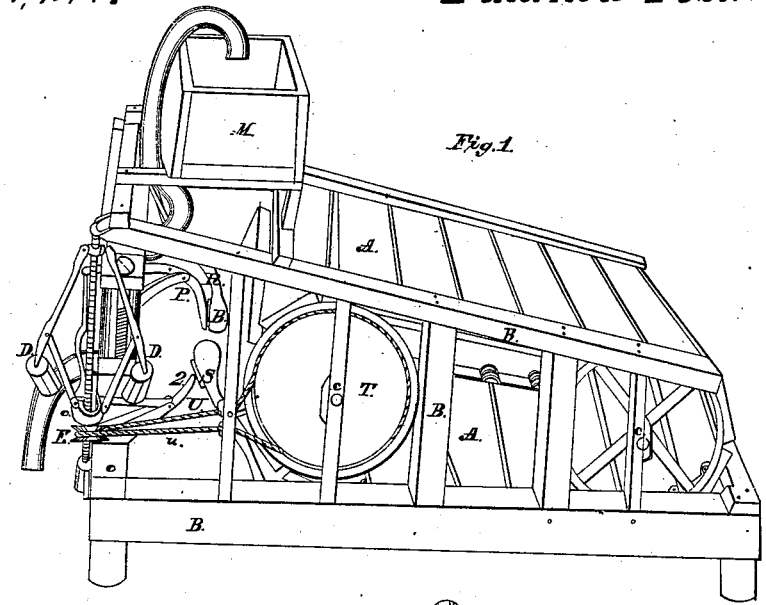
Fig. 1
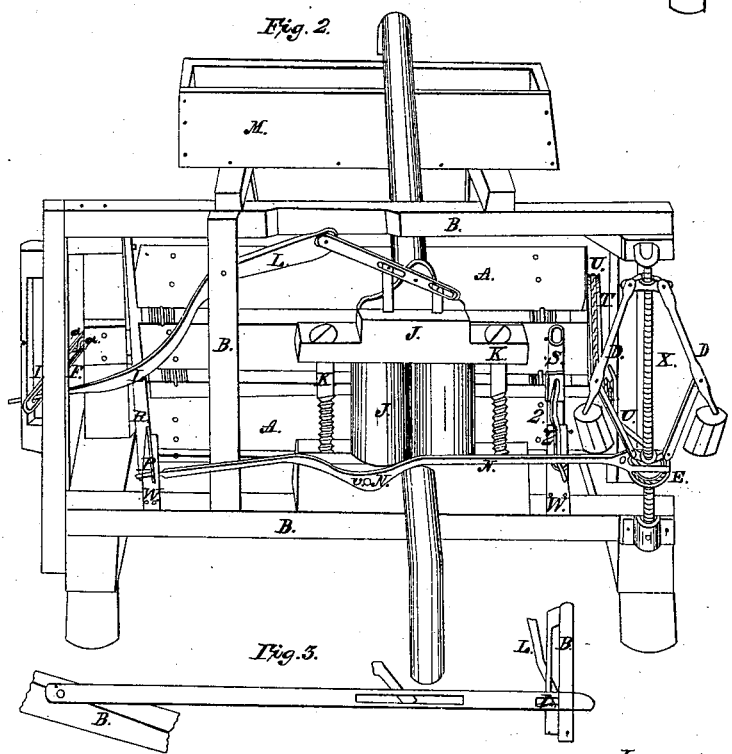
Fig. 2
Fig. 3
Attest:
Henry Ashury
John S. Emmert
Inventor:
Warren Alonzo Durrin

UNITED STATES PATENT OFFICE.

WARREN A. DURRIN, OF MILLEDGEVILLE, ILLINOIS.

IMPROVEMENT IN STOCK-PUMPS.

Specification forming part of Letters Patent No. 37,744, dated February 24, 1863.

*To all whom it may concern:*

Be it known that I, WARREN ALONZO DURRIN, of Milledgeville, in the county of Carroll, in the State of Illinois, have invented a new and improved device for watering stock, operated by the cattle while drinking; and I do hereby declare that the following is a full and exact description thereof, reference being had to the accompanying drawings, and to the letters of reference marked thereon.

The nature of my invention consists in providing and combining an inclined plane, endless-apron horse or cattle power, governor, and brakes with a pump, in such a manner that cattle coming to the trough to drink will set the pump in operation and elevate the water from a well or other reservoir required to water them.

To enable others skilled in the art to make and use my invention, I will proceed to describe its construction and operation.

I construct my inclined-plane horse or cattle power A A in any of the known or usual forms, and attach it to the frame B B B, Figs. 1 and 2, by shafts and pivots *c c*, so that it can revolve freely when the weight of the cattle rests on it. I also provide a governor, constructed in the usual manner, as shown at D D, Figs. 1 and 2, for the purpose of regulating the motion of the inclined-plane apron, horse or cattle power. I use any of the known kinds or forms of pumps. To the end of the pump-lever I attach a pitman, F, Figs. 2 and 3, and attach it to the frame B B by pivots, and having a slot for the crank G to pass through, as shown at H, Fig. 3, and also a slot near the end of it for the pump lever L to pass through, as shown at I, Figs. 2 and 3. I attach the pump J J, Fig. 2, to the frame with screws, as shown at K K, or in any other suitable manner. On the top of the frame B B I place a trough, M, to receive and hold the water that is discharged from the pump, as shown at M, Figs. 1 and 2. I also construct two brakes, R and S, Figs. 1 and 2. I then construct two brake-levers, P and Q, Figs. 1 and 2, and attach them by pivots to two uprights, W W, Fig. 2, which are secured to the frame B B. I then construct a lever, N N, and attach it to the frame near the middle by a pivot, V, and at the forked end it is attached loosely to the sliding pulley of the governor, as shown at O, Figs. 1 and 2, and to the ends of which the brake levers P and Q are loosely attached, so that when the weights of the governor are raised up the brakes are pressed against the inclined-plane endless apron, for the purpose of regulating the speed of the pump. I also attach a grooved pulley, T, Fig 1, on the shaft which carries the endless apron, to hold the cord U U, Figs. 1 and 2, to connect it with the governor by a small pulley, E, on the governor-shaft X.

The following is the manner in which this invention is operated: When the cattle go to the trough to drink, their weight on the endless apron causes it to revolve, when the crank which is attached to one of its pinions or shafts raises and lowers the pitman, and that operates the lever of the pump, and the whole is regulated by the governor acting on the brakes, which will check the power when the motion becomes too much accelerated, and the result is that cattle can be watered without personal attendance.

What I claim as my invention, and desire to secure by Letters Patent, is—

The combination of the inclined endless apron A A and frame B B, in connection with the governor D D and brakes R and S, and the pitman F, when applied to operate a pump, as and in the manner delineated and specified.

WARREN ALONZO DURRIN.

Witnesses:
HENRY ASHWAY,
JOHN S. EMMERT.